US007006154B2

(12) United States Patent
Dudkowski

(10) Patent No.: US 7,006,154 B2
(45) Date of Patent: Feb. 28, 2006

(54) PORTABLE SYSTEM FOR LIVE TELEVISION SIGNAL EDITING

(76) Inventor: Edmond Louis Dudkowski, 3020 Bridgeway, #279, Sausalito, CA (US) 94965

( * ) Notice: Subject to any disclaimer, the term of this patent is extended or adjusted under 35 U.S.C. 154(b) by 344 days.

(21) Appl. No.: 10/081,543

(22) Filed: Feb. 20, 2002

(65) Prior Publication Data

US 2002/0126226 A1    Sep. 12, 2002

Related U.S. Application Data

(60) Provisional application No. 60/270,935, filed on Feb. 21, 2001.

(51) Int. Cl.
*H04N 5/445*    (2006.01)
(52) U.S. Cl. .................................... 348/588
(58) Field of Classification Search ............... 348/588, 348/589, 598, 552, 553, 158, 159, 148; 386/46, 386/52
See application file for complete search history.

(56) References Cited

U.S. PATENT DOCUMENTS

| | | | | |
|---|---|---|---|---|
| 4,855,813 A | * | 8/1989 | Russell et al. ............... 348/559 |
| 5,206,929 A | | 4/1993 | Langford et al. ............ 395/159 |
| 5,767,897 A | * | 6/1998 | Howell ..................... 348/14.07 |
| 5,848,352 A | | 12/1998 | Dougherty et al. |
| 5,912,700 A | * | 6/1999 | Honey et al. ............... 348/157 |
| 5,946,445 A | * | 8/1999 | Peters et al. ............... 386/52 |
| 5,956,081 A | * | 9/1999 | Katz et al. ................. 348/163 |
| 6,058,236 A | * | 5/2000 | Peters et al. ............... 386/46 |
| 6,134,380 A | | 10/2000 | Kushizaki .................. 386/55 |
| 6,628,299 B1 | * | 9/2003 | Kitayama ................... 345/635 |
| 6,678,461 B1 | * | 1/2004 | Peters et al. ............... 386/52 |
| 6,700,625 B1 | * | 3/2004 | Fujii ......................... 348/588 |
| 2002/0124260 A1 | * | 9/2002 | Rivera ....................... 725/105 |

OTHER PUBLICATIONS

International Search Report from PCT/US02/05192, mailed Jul. 23, 2002.
Pinnacle Systems, "StreamGenie—Live Webcasting Production System," Pinnacle Systems, Inc., 2000, pp. 1-2.
The J-Lab Co., "Portable Production Equipment: CFS-1, "Brochure, pp. 1-3.

* cited by examiner

Primary Examiner—Paulos M. Natnael
(74) Attorney, Agent, or Firm—Nixon Peabody LLP

(57) ABSTRACT

A system and method for editing live television signals. This system includes: a plurality of input connectors for receiving separate input video signals, and an output connector; a mixer for generating at the output connector a real-time output video signal derived from at least one of the input video signals; a single display monitor for simultaneously displaying each of the input video signals and the output video signal; and an imager coupled between the mixer and the display monitor for causing at least three images to be displayed on the display monitor in a split-screen format, the at least three images corresponding to the input video signals and the output video signal. The system in enclosed in a portable suitcase housing.

13 Claims, 3 Drawing Sheets

PORTABLE SYSTEM FOR LIVE TELEVISION SIGNAL EDITING

This application claims the benefit of U.S. Provisional Application No. 60/270,935 filed Feb. 21, 2001.

FIELD OF THE INVENTION

This invention relates to a system for television signal processing and, more specifically, to an improved portable system for editing multiple live television signals.

BACKGROUND OF THE INVENTION

The traditional medium for editing and broadcasting live video and audio signals is live television, for example, to broadcast live sporting events. A live television signal is defined as a video signal of an event that is captured by a video camera and an accompanying audio signal that is captured, for instance, by a microphone, both of which are transmitted via one or more video and audio media while the event is still occurring, i.e., in real time. The current technology used for broadcasting a live sporting event on television is a "TV remote truck" or a similar type van. The TV remote truck typically contains hundreds of thousands of dollars worth of equipment used to edit video signals from multiple video cameras that capture the event from different angles. The equipment in the TV truck typically includes a wall of television monitors. Separate monitors display the output of each camera. A preview monitor displays the next possible live camera or video source that may be released for on-air programming, and a program monitor displays the live camera or video source that the television audience is viewing at the time of the live event or the event being recorded. The equipment inside the TV truck also includes audio monitoring equipment, an audio and video mixer and switcher for combining and switching between the different video and accompanying audio signals of the event, a private line (P-L) communications system for a director to communicate with camera operators, a tally system to cue camera operators, and video and audio synchronizing equipment.

The director is a key person who coordinates the use of all of the above TV truck equipment to create an exciting live television event as seen by viewers generally all across the nation, and sometimes the world. She is responsible for making the critical, on-the-spot judgement calls needed in live television, where there is no such thing as a "second take."

The current TV truck technology contains numerous significant shortcomings. First, use of this technology is extremely costly in both the raw cost of the equipment inside the truck as well as the cost in man-hours to operate this equipment. Since the TV truck equipment utilizes analog standard 26-pin connector technology, only the expensive cameras (generally costing $50,000 each or more) are compatible with the TV truck equipment. This further raises the cost of live television broadcasting via this prior art technology. Moreover, the above analog cameras must be synchronized, which requires additional equipment such as waveform monitors to measure timing and voltages of the video signals and vectorscopes to measure color information. Skilled technicians are needed to operate this equipment, again raising the cost associated with live television broadcasting using the TV truck technology.

The high costs associated with using the TV truck technology are extremely prohibitive. Generally only major networks, TV stations and some well-funded cable TV systems can afford to produce live television programming using this technology. However, even these entities may choose not to use the technology to create programming other than major or professional sporting events because the production costs are typically too high to justify smaller events. On the other hand, small companies, schools, and hobbyists, for example, who may want to create live local programming simply cannot afford to use this equipment.

The second major shortcoming of the TV truck analog technology is its incompatibility with the quickly emerging digital video technology. Of course, analog signals can be converted to digital signals for processing, but this doesn't necessarily solve the above-described limitations of existing methods and technology. The new digital television and video standards combined with the expanding bandwidth of the World Wide Web are creating an enormous vacuum for programming content, i.e., "Webcasting". In addition, broadcast quality cameras are available at the local electronics store for as little as $1500, and these cameras produce pictures equal to if not better than the $50,000 cameras used with the TV truck technology. There is no system that puts into both sophisticated users', e.g., major TV networks, and non-sophisticated users', e.g., high school students and teachers, hands the ability to create professional quality multi-camera live or live-to-tape programming at a reasonable cost in this expansive new Webcasting medium.

The third major shortcoming of the TV truck technology is that it takes an engineering approach to live television signal editing and broadcasting. In other words, the main purpose is to assemble the equipment needed to get the content out. However, there is very little regard to the difficulties of the crucial, time-sensitive decisions that a program director must make while creating program content. For instance, the multiplicity of television monitors that the director must watch and the other equipment and personnel needed to operate the TV truck equipment all function as significant distractions to the director.

The J-Lab Co. offers a video production system that merely addresses the issue of portability. This system, however, is also based upon analog technology and is relatively costly. Therefore, the unit does not allow the use of industrial and consumer level cameras. The J-Lab system instead relies on broadcast analog standard 26-pin connector technology. Moreover, the J-Lab system's analog output does not produce a digitally encoded signal that can be immediately encoded into a webcast audio/video-streaming device for live transmission onto the World Wide Web. Another shortcoming of the J-Lab system is that it uses individual display monitors causing the director to have to shift his eyes from screen display to screen display and past the frame lines and bezels of each framed picture, causing more eye motion than is desirable.

Pinnacle Systems also offers a portable production system called the StreamGenie™, but this system also fails to address all of the shortcomings of the prior art. For instance, the StreamGenie™ has a human interface design which makes it very difficult for a TV director to edit images from multiple cameras in a typical fast-paced, live production environment because the system only allows two camera images on the system's screen at one time, and these images are extremely small. This prevents the director from seeing the detail that a director must consider, nearly instantly, to make a live editing decision.

What is needed is an improved portable system for editing multiple live television signals.

SUMMARY OF THE INVENTION

The present invention is directed at addressing the above-mentioned shortcomings, disadvantages, and problems in the prior art. The present invention is a system for editing live television signals comprising: a plurality of input connectors for receiving separate input video signals, and an output connector; a mixer for generating at said output connector a real-time output video signal derived from at least one of said input video signals; a single display monitor for simultaneously displaying each of said input video signals and said output video signal; and an imager coupled between said mixer and said display monitor for causing at least three images to be displayed on said display monitor in a split-screen format, said at least three images corresponding to said input video signals and said output video signal. The system also comprises at least one additional input connector for receiving one or more separate input audio signals and an additional output connector, said mixer further for generating at said additional output connector a real-time output audio signal derived from at least one said input audio signal.

The mixer also preferably comprises least two time base correctors and a plurality of video transitions and special effects, said mixer further for generating a preview signal derived from at least one of said input video signals. The imager preferably comprises a first, second and third quad split PC board coupled together to generate a desired display arrangement on said display monitor. The display monitor is preferably a single liquid crystal display output that is factory set to a color reference standard, and has a computer VGA output to drive an optional computer monitor.

The system for editing live television signals also preferably comprises: an input panel coupled to said mixer comprising said plurality of input connectors for receiving said input video signals and said at least one additional input connector for receiving said one or more separate input audio signals; a monitor patch panel coupled between said imager and said mixer and coupled to said input panel; an audio monitoring system coupled to said mixer, having stereo loudspeakers, headphone jacks and volume level controls; a private line communication and tally system coupled to said mixer; an output panel coupled to said mixer and said P-L communication and tally system comprising each said output connector; a portable housing for containing said system for editing live television signals; a flexible arm light attached to said housing for illuminating said system for editing live television signals in low light levels; and a hood detachably attached to said housing for decreasing ambient light on said display monitor. Finally, the housing is preferably a flat black color to minimize visual reflections.

The present invention is also a method for editing video signals comprising: a) causing at least one of a plurality of input video signals comprising analog and digital input signals to be edited to generate an output video signal; b) causing at least one of a plurality of input audio signals to be edited to generate an output audio signal; c) causing each said input video signal and said output video signal to be viewed on a single display monitor; and d) causing each said input audio signal and said output audio signal to be heard.

The object of the present invention is to provide for an improved portable system for editing multiple live television signals.

One key advantage of the present invention is that the system does not have to be permanently attached to a motor vehicle. It may be hand-carried to remote locations, thereby being portable. Moreover, the system is dimensioned to be easily be stored as carry on luggage on an airplane.

Another key advantage of the present invention is that it is cost-efficient since it does not rely on expensive TV truck analog equipment and the accompanying man power needed to operate that equipment. For instance, the present invention includes a single monitor, instead of multiple monitors. The present invention also includes at least two time base correctors at the inputs of the mixer to create a "plug and play" system that is compatible with both analog and digital video input signals without the need for additional costly synchronizing equipment or engineers and technicians to operate that equipment.

Another advantage of the present invention is that it is sensitive to the needs of a director for live television programming. For instance, the single display eliminates the need for the director to shift his eyes between several monitors and also eliminates the need for the director to determine which color monitor to trust. Moreover, the inclusion of a hood decreases ambient light on the display monitor, and use of a flexible arm light enables the input and output panels and mixer components to be viewed in low light levels. Finally, most surfaces of the housing are finished in flat black to minimize visual reflections that could distract the director.

Another advantage of the present invention is that the output panel is configured so that the outputs can simultaneously be streamed, for instance, to a video recorder, a computer, a microwave device, a satellite device, a hard-drive and a DVD device. In addition, the present invention produces a digitally encoded signal that can be immediately encoded into a webcast audio/video streaming device for live transmission onto the World Wide Web, thus utilizing digital video and television technology.

Another advantage of the present invention is that it can be easily used by both professionals and amateurs, while producing high quality programming content.

BRIEF DESCRIPTIONS OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 1:
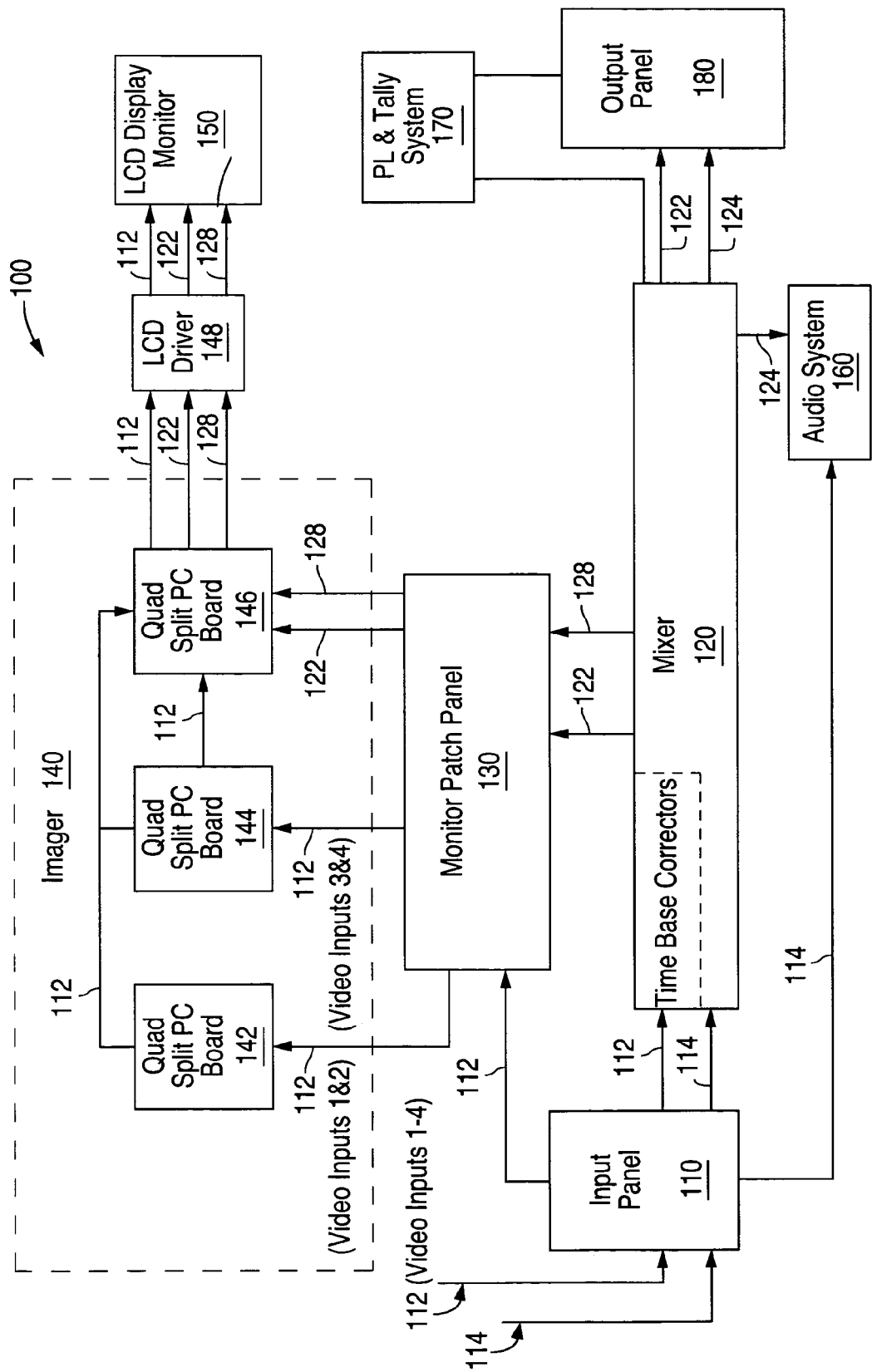
FIG. 1 is a block diagram illustrating a system for editing live television signals according to a preferred embodiment of the present invention.

FIG. 1 is a block diagram illustrating a system 100 for editing live television signals according to a preferred embodiment of the present invention. System 100 comprises: an input panel 110, a mixer 120, a monitor patch panel 130, an imager 140 having three quad split PC boards 142, 144 and 146, respectively, an LCD driver 148, a display monitor 150, an audio monitoring system 160, a two-channel P-L (Private Line) headphone communication and tally system 170 and an output panel 180. The lines between the above sub-components of system 100 illustrate the interconnection of these sub-components. These sub-components are coupled together using industry standard wires and connectors as appropriate.

System 100 operates as follows. Ideally, at least four separate cameras, e.g., camera 1, camera 2, camera 3, and camera 4, respectively, capture an event that will be broadcast on a live television program or on a live web casting program. One of ordinary skill in the art will realize that more or fewer cameras may be used and that the event may also be recorded. Each camera generates an input video signal that is streamed into input panel 110. FIG. 1 illustrates the input video signals 1, 2, 3 and 4 from camera 1, camera 2, camera 3 and camera 4, being collectively streamed into input panel 110 as input video signals 112.

The event may also have associated with it one or more audio signals from one or more sources, such as a microphone, a tape player, or a mixing console. FIG. 1 further illustrates one or more input audio signals being collectively streamed into input panel 110 as input audio signals 114. Additional input video signals, e.g., input signals 5, 6, 7 and 8, may also be streamed into input panel 110, and input video signals 112 and input audio signals 114 may include prerecorded signals. Input panel 110 includes a plurality of industry standard connectors for receiving the input video signals 112, which can be analog or digital signals, and the input audio signals 114 which can also be digital or analog signals. These connectors can be arranged as desired, and each connector preferably receives a separate input signal.

From input panel 110, input video signals 112 and input audio signals 114 are streamed into mixer 120 for editing by a director of the event being broadcast. Editing includes monitoring, selecting, switching and mixing these input signals. Input video signals 112 are also streamed to monitor patch panel 130, and input audio signals 114 are further streamed to audio monitoring system 160. Mixer 120 preferably includes internal circuitry that causes at least one input video signal to be edited to generate a real-time output video signal 122, and that causes a preview signal 128 to be generated. Mixer 120 also preferably includes internal circuitry that causes at least one input audio signal to be edited to generate a real-time output audio signal 124. Input video signals 112, preview signal 128 and output video signal 122 are simultaneously streamed through monitor patch panel 130 into quad split PC boards 142, 144 and 146 of imager 140 to cause these signals to be streamed to display monitor 150 for viewing. Input audio signals 114 and output audio signal 124 are simultaneously streamed to audio monitoring system 160. Finally, output video signal 122 and output audio signal 124 are streamed to output panel 180 to enable these signals to be coupled to external devices.

The preferred embodiment of each sub-component will now be described. Ideally, mixer 120 is configured to receive multiple live video signal standards including composite video signals, component video signals, e.g., S-video, and digital video signals, e.g., Firewire, and to cause these input video signals to be edited to generate output video signals of the same standards. Mixer 120 is also preferably configured to edit the accompanying live audio signals, as well as pre-recorded video and audio input signals. Preferably, mixer 120 comprises four composite video inputs, four S-video inputs, two Firewire inputs, at least two S-video outputs, at least two composite outputs, and at least one Firewire output. Mixer 120 also preferably includes a preview screen output that is preferably coupled to quad split PC board 146 to cause a preview video signal to be streamed to display monitor 150 for viewing. Mixer 120 further comprises eight audio inputs and four audio outputs that enable synchronized audio mixing.

Mixer 120 preferably further comprises at least two time base correctors (TBCs) at its inputs that eliminate the need to send a reference sync and sub-carrier signal back to each individual camera. The TBCs also eliminate the need for highly technically skilled operators to measure and make adjustments for syncing the horizontal, vertical and color sub-carrier phase of each camera with reference to mixer 120. Inclusion of these TBCs in mixer 120 enables system 100 to be a "plug and play" system, which allows multiple video inputs from cameras using a variety of standards to achieve sync compatibility without the need for additional costly equipment. Finally, mixer 120 preferably includes a plurality of video transitions and special effects, including fades, dissolves, zooms, and trailing effects for the director's use. An example of a mixer sub-system that may be used in system 100 is a MXProDV Digital Video Mixer by Videonics.

Input video signals 112, the output video signal 122, and the preview signal 128 are streamed through monitor patch panel 130. Monitor patch panel 130 is also preferably configured to enable the director to easily reassign any one of the images displayed on display monitor 150, i.e., the input video signals 112, the output video signal 124, or the preview signal, to any other position or to one or more external displays or external devices, when necessary, without disrupting the functionality of system 100.

Imager 140 is configured to receive the input video signals 112, the output video signal 122, and the preview signal 128 and to cause those signals to be appropriately streamed to display monitor 150 for viewing by the director. Preferably, imager 140 comprises three quad split PC boards 142, 144 and 146. Ideally each quad split PC board can accept a maximum of four live color video signals, either analog or digital, and display these signals simultaneously on a single display screen by dividing the screen into four quadrants. In addition, each quad split PC board comprises an output that may be used to stream the video signals either to a video display device or to another quad split PC board. An example of a quad split PC board that may be used in imager 140 is the internal board in the Elite Miniplex unit by Elite Video.

Figure 2:
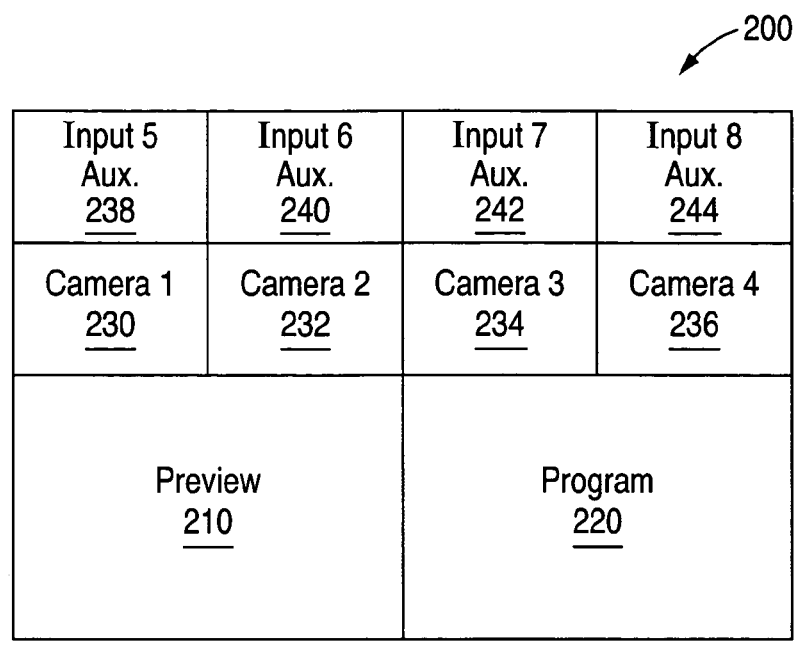
FIG. 2 is a block diagram illustrating how each input video signal, an output video signal, and a preview signal is preferably displayed on the display monitor screen of the system illustrated in FIG. 1.

Quad split PC boards 142, 144 and 146 are interconnected to enable input video signals 112, output video signal 122, and the preview signal 128 to be displayed on display monitor 150 as display arrangement 200 illustrated in FIG. 2. Input video signals 112 from camera 1, camera 2, camera 3 and camera 4 are displayed in blocks 230, 232, 234 and 236, respectively. A preview of the next input video signal that will be broadcast to the audience i.e., the preview signal 128 from mixer 120, is displayed in block 210, and the live output video signal 122 generated by mixer 120 that is broadcast, for instance, to the audience or recorded to external devices, is displayed in program block 220. To achieve display arrangement 200, video inputs 1 and 2 from cameras 1 and 2, respectively, are streamed into quad split PC board 142. PC Board 142 may also be configured to receive video inputs 5 and 6. Video inputs 3 and 4 from cameras 3 and 4, respectively, are streamed into quad split PC board 144. PC board 144 may also be configured to receive video inputs 7 and 8. Finally, output video signal 128 and preview signal 126 are streamed to quad split PC board 146, and PC board 146 is configured to zoom to a full screen display of the preview or output signal and then back again to display 200. Other items such as additional video sources, i.e., input 5, input 6, input 7 and input 8 as illustrated in FIG. 2, a clock or audio level indicators, as determined by the director, may be displayed in the remaining four Aux. blocks 238, 240, 242 and 244.

The display arrangement 200 illustrated in FIG. 2 is one example of how the various signals generated by the cameras and by mixer 120 may be simultaneously displayed. Display arrangement 200 is preferred because it is consistent with industry standard control room convention having input monitoring on top, preview monitoring below the inputs on the left and program (or line) monitoring below the inputs on the right. The arrangement of the input and output signals on display monitor 150 can be varied according to a user's needs by varying the interconnection of these quad split PC boards.

LCD driver 148 is coupled between imager 140 and display monitor 150 and is preferably configured to convert composite video signals from the output of the quad split PC board 146 into the proper signals to input into display monitor 150. LCD driver 148 also preferably includes "line doubling" circuitry to increase the apparent screen resolution of the pictures shown in display monitor 150, providing more apparent detail and eliminating TV scan lines from display monitor 150. LCD driver 148 may be a commercially available driver board.

Display monitor 150 is a single TFT (thin film transistor) liquid crystal display (LCD) of high-resolution broadcast quality that includes a display screen having dimensions that enable the director to see sufficient detail of each input video signal, the output video signal and the preview signal. Ideally the dimensions of the display monitor screen are 17" diagonally. Use of a single display monitor eliminates the distraction to the director of having to shift her eyes back and forth between several monitors to make editing decisions.

Preferably display monitor 150 is factory set to a color reference standard that does not need attention or resetting in the field, simplifying the TV production process. Use of a single monitor with a pre-set color reference overcomes one of the most problematical elements in the traditional television control room, which is determining which monitor or monitors are showing the most realistic picture. Individual monitors can be subject to drift due to age and temperature conditions, and a monitor's external adjustment controls for contrast, brightness, color intensity and color hue can vary from monitor to monitor. Thus, it can be difficult, if not impossible, to determine whether one video input signal needs to be adjusted with respect to a second, or plurality of video input signal(s) or whether the individual monitors are simply not properly adjusted. By using a single pre-set monitor display for all signals, the differences and similarities of contrast, brightness, color intensity and color hue between individual signals can be easily seen and the cause for the differences determined quickly and easily without complex measurements. Display monitor 150 also preferably includes an industry standard computer VGA output to enable an external computer monitor to be coupled to system 100 if larger screen images are desired or if a separate switcher and director function is desired, i.e., where a director "calls" the shots from her own monitor, and a switcher (or technical director) presses the buttons.

System 100 also comprises audio monitoring system 160. Audio monitoring system 160 preferably comprises an LED display set which shows the audio levels of the input audio signals 114 and the output audio signal 124. Audio monitoring system 160 also preferably comprises at least one monitor volume control, at least one loud speaker and at least one headphone terminal to enable the director to monitor the quality of the audio signals. The monitoring level is ideally controllable by a front panel volume control that is independent of the actual audio levels being transmitted or recorded.

System 100 further comprises a P-L and tally system 170. P-L and tally system 170 enables the director to speak to camera operators and to send visual "on-air" indicators to each camera operator, which indicate which camera video signal is being broadcast as an output signal.

All composite, S-video, and digital video outputs 122 and all audio outputs 124 of mixer 120 and P-L tally connectors are wired to output panel 180 so that output signals created by mixer 120 can be streamed into external devices. Output panel 180, therefore, preferably comprises a plurality of industry standard connectors to enable output video signal 122 and output audio signal 122, which can be either analog or digital signals, to be simultaneously streamed, for instance, to a video recorder, and internet compression/streaming computer, a microwave device, a satellite device, a hard-drive and a DVD device. Moreover, system 100 produces a digitally encoded signal that can be immediately encoded into a webcast audio/video streaming device for live transmission onto the World Wide Web. These output connectors can be arranged as desired.

Figure 3:
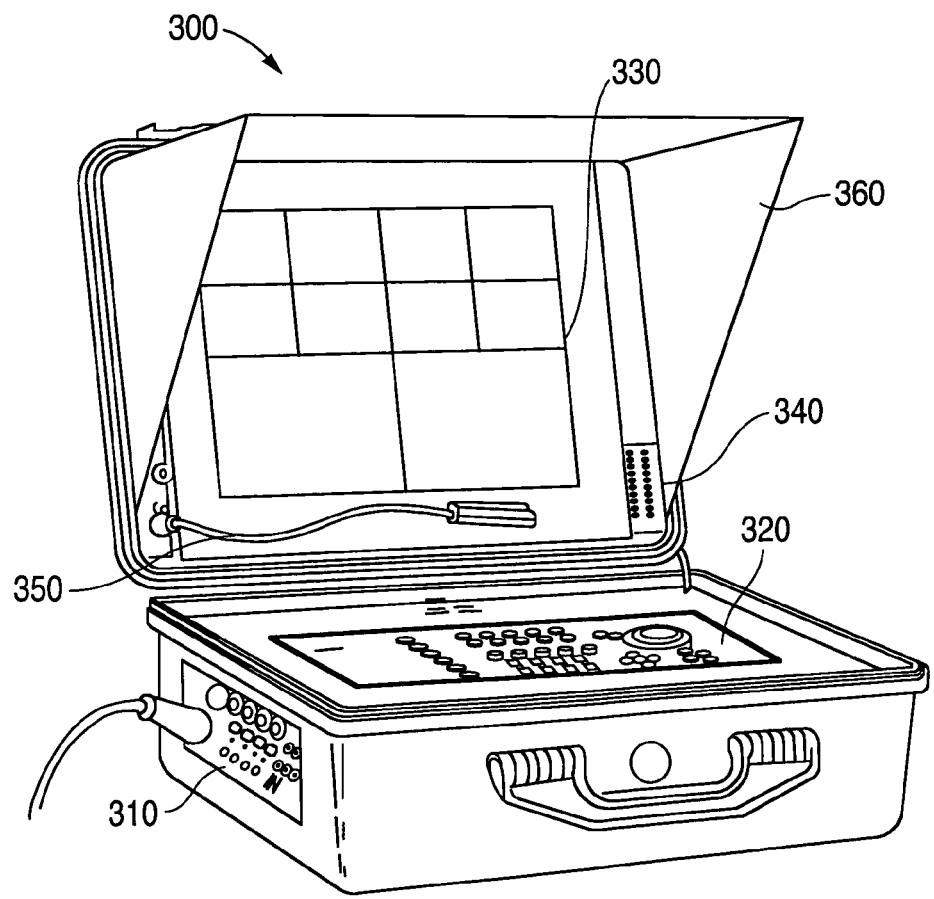
FIG. 3 illustrates a preferred portable housing for the present invention, with the housing lid open such that the arrangement, therein, of the sub-components of the system illustrated in FIG. 1 can be viewed.
Figure 4:
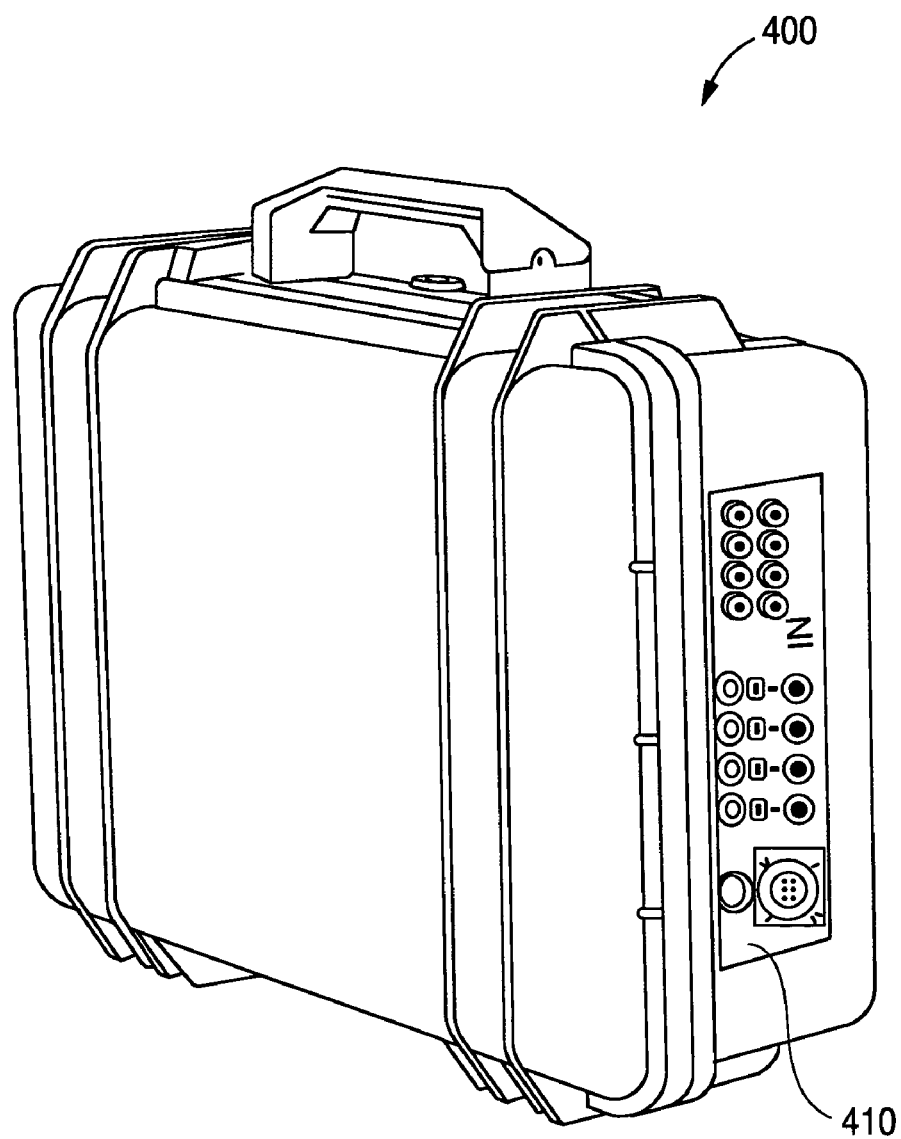
FIG. 4 illustrates a preferred portable housing for the present invention, with the housing lid closed such that the outside of the housing can be viewed.

System 100 is preferably powered from a 110 to 220 volt, 50 to 60 cycle AC power supply. System 100 is preferably self-contained in a rugged, plastic suitcase type container allowing very easy portability, set-up and use as shown in FIG. 3 and FIG. 4. Ideally, system 100 can be hand carried, and its dimensions are such that it can easily be stored as carry-on luggage on an aircraft. Preferably, those dimensions are about 19"L×15"W×7"D. Moreover, a lid, when open, provides a good viewing angle for the operator.

FIG. 3 illustrates a preferred portable housing 300 for the present invention. Housing 300 is illustrated with a lid being open such that the arrangement, therein, of the sub-components of the system 100 illustrated in FIG. 1 can be viewed. As illustrated in FIG. 3, preferably an input panel 310 is located on the left side of housing 300. A mixer 320 is located in the interior and at the bottom of housing 300. A display monitor 330 is located at the top, i.e., the lid, of housing 300. A set of LED monitors 340 for an audio system is also located in the lid of housing 300. An output panel (not shown) is located on the right side of housing 300, and a monitor patch panel (not shown) is located at the backside of housing 300. The layout of housing 300 having inputs on the left, the monitor patch panel in the center, and outputs on the right facilitates logical and quick understanding of the system by an operator, since it duplicates the direction of signal flow. Other features are preferably included to optimize conditions for the director. For instance, FIG. 3 shows a hood 360 that is used to decrease ambient light on the LCD display, and a flexible arm light 350 that can be dimmed and that enables the input and output panels and mixer keys to be viewed in low light levels.

FIG. 4 illustrates a preferred portable housing for the present invention, with the housing lid closed such that the outside of the housing can be viewed, including an input panel 410. Preferably, the input, output and patch panels are angled on the housing in such a way as to enable easier viewing of the individual connectors than if those panels were parallel to the sides of the case. This also protects the connectors from damage during handling and shipping.

Moreover, the input terminals of the input panel and the output terminals of the output panel are ideally grouped so that, if necessary, two people may make industry standard connections at the same time without interfering with each other during set-up.

Finally, most surfaces on the unit are preferably finished in flat black to minimize visual reflections that could distract the director who needs full concentration on the actual color video camera images and preview and program monitor to do his best editing decision making.

The implementation example of a method system for editing live television signals described in the text above was chosen as being illustrative of the best mode of the present invention. All embodiments of the present invention described above are illustrative of the principles of the invention and are not intended to limit the invention to the particular embodiments described. Accordingly, while the preferred embodiment of the invention has been illustrated and described, it will be appreciated that various changes can be made therein without departing from the spirit and scope of the invention.

What is claimed is:

1. A system for editing television signals comprising:
   a plurality of input connectors for receiving separate input video signals, and an output connector;
   a mixer for generating at said output connector a real-time output video signal derived from at least one of said input video signals;
   a single display monitor for simultaneously displaying each of said input video signals and said output video signal; and
   an imager coupled between said mixer and said display monitor for causing at least three images to be displayed on said display monitor in a split-screen format, said at least three images corresponding to said input video signals and said output video signal;
   at least one additional input connector for receiving one or more input audio signals and an additional output connector, said mixer further for generating a real-time output audio signal at said additional output connector derived from at least one said input audio signal;
   an input panel coupled to said mixer comprising said plurality of input connectors for receiving said input video signals and said one or more input audio signals;
   a monitor patch panel coupled between said input panel, said mixer and said imager;
   an LCD driver coupled between said imager and said display monitor;
   an audio monitoring system coupled to said mixer and said input panel for causing each said input audio signal and said output audio signal to be heard;
   a private line (P-L) communication and tally system coupled to said mixer; and
   an output panel coupled to said mixer and said P-L communication and tally system comprising each said output connector.

2. The system of claim 1, further comprising a portable housing for containing said system for editing television signals.

3. The system of claim 2, further comprising a flexible arm light attached to said housing for illuminating said system for editing television signals in low light levels.

4. The system of claim 2, further comprising a hood detachably attached to said housing for decreasing ambient light on said display monitor.

5. The system of claim 2, wherein said housing is flat black to minimize visual reflections.

6. The system of claim 2, said input panel connectors comprising at least one analog video signal connector, at least one digital video signal connector, at least one analog audio signal connector, and at least one digital audio signal connector.

7. The system of claim 3, wherein said input panel, said output panel and said monitor patch panel are disposed on said housing to enable logical and quick understanding by an operator of said system for editing television signals.

8. The system of claim 7, wherein said input panel is located on a left side of said housing, said output panel is located on a right said of said housing, and said monitor patch panel is located at a backside of said housing.

9. The system of claim 8, wherein said input and output panels are each disposed at an angle to enable easier viewing of said input panel connectors and said output panel connectors.

10. The system of claim 2, said audio monitoring system comprising an LED display set, at least one monitor volume control, at least one loud speaker and at least one headphone connector.

11. The system of claim 2, said output panel connectors comprising at least one analog video signal connector, at least one digital video signal connector, at least one analog audio signal connector, and at least one digital audio signal connector.

12. The system of claim 11, said output panel connectors for causing said output video signal and said output audio signal to be coupled to a video recorder, a computer, a microwave device, a satellite device, and a DVD device.

13. A system for editing television signals comprising:
   a plurality of input connectors for receiving separate input video signals and at least one input audio signal and at least two output connectors;
   a mixer for generating at one said output connector a real-time output video signal derived from at least one of said input video signals, for generating at a separate output connector a real-time output audio signal derived from at least one said input audio signal, and for generating a preview signal derived from at least one of said input video signals;
   a single display monitor for simultaneously displaying each of said input video signals and said output video signal;
   an imager coupled between said mixer and said display monitor, said imager comprising a first, second and third quad split PC board coupled together for causing at least three images to be displayed on said display monitor in a split-screen format, said at least three images corresponding to said input video signals and said output video signal;
   an input panel coupled to said mixer comprising each of said input connectors;
   a monitor patch panel coupled between said input panel, said mixer and said imager;
   an LCD driver coupled between said imager and said display monitor;
   an audio monitoring system coupled to said mixer and said input panel for causing each said input audio signal and said output audio signal to be heard;
   a private line (P-L) communication and tally system coupled to said mixer;
   an output panel coupled to said mixer and said P-L communication and tally system comprising each said output connector; and
   a portable housing for containing said system for editing television signals.

* * * * *